(12) United States Patent
Dhiman

(10) Patent No.: US 11,361,661 B2
(45) Date of Patent: Jun. 14, 2022

(54) IN-VEHICLE INFOTAINMENT SYSTEM COMMUNICATING WITH UNMANNED AERIAL VEHICLE AND METHOD OF OPERATING THE SAME

(71) Applicant: Samsung Electronics Co., Ltd., Gyeonggi-do (KR)

(72) Inventor: Shivsharad Dhiman, Noida (IN)

(73) Assignee: Samsung Electronics Co., Ltd

( * ) Notice: Subject to any disclaimer, the term of this patent is extended or adjusted under 35 U.S.C. 154(b) by 315 days.

(21) Appl. No.: 16/508,914

(22) Filed: Jul. 11, 2019

(65) Prior Publication Data
US 2020/0020231 A1 Jan. 16, 2020

(30) Foreign Application Priority Data

Jul. 11, 2018 (IN) .............................. 201811025906
Apr. 15, 2019 (KR) ......................... 10-2019-0043763

(51) Int. Cl.
*G08G 1/16* (2006.01)
*G08G 5/00* (2006.01)
(Continued)

(52) U.S. Cl.
CPC ....... *G08G 1/096791* (2013.01); *B60K 35/00* (2013.01); *B64C 39/024* (2013.01);
(Continued)

(58) Field of Classification Search
CPC ........... G08G 1/096791; G08G 5/0078; G08G 5/0069; G08G 1/166; G08G 1/167; G08G 1/163; G08G 1/16; G06K 9/00825; G06K 9/00798; G06K 9/00791; G06K 9/00; B60K 35/00; B60K 2370/193; B60K 2370/5915;
(Continued)

(56) References Cited

U.S. PATENT DOCUMENTS 9,170,117 B1 10/2015 Abuelsaad et al.
9,576,493 B2 * 2/2017 Jarrell .................. G08G 5/0043
(Continued)

FOREIGN PATENT DOCUMENTS

CN 104036279 9/2014
CN 106094809 11/2016
(Continued)

OTHER PUBLICATIONS

International Search Report dated Oct. 8, 2019 issued in counterpart application No. PCT/KR2019/008237, 11 pages.

*Primary Examiner* — Yonel Beaulieu
(74) *Attorney, Agent, or Firm* — The Farrell Law Firm, P.C.

(57) ABSTRACT

A method performed by an in-vehicle infotainment (IVI) system of a vehicle includes identifying an out-of-sight view of the vehicle, determining that information related to the identified out-of-sight view needs to be received from an unmanned aerial vehicle (UAV), identifying coordinates on the identified out-of-sight view to locate the UAV, based on an environment condition at a current position and at a future position of the vehicle, transmitting a signal indicating the coordinates to the UAV, and receiving the information related to the identified out-of-sight view from the UAV located at the coordinates.

14 Claims, 15 Drawing Sheets

(51) Int. Cl.
*G06K 9/00* (2006.01)
*B64C 39/02* (2006.01)
*B60K 35/00* (2006.01)
*G08G 1/0967* (2006.01)

(52) U.S. Cl.
CPC ..... *G06K 9/00798* (2013.01); *G06K 9/00825* (2013.01); *G08G 1/166* (2013.01); *G08G 5/0069* (2013.01); *G08G 5/0078* (2013.01); *B64C 2201/127* (2013.01); *B64C 2201/208* (2013.01)

(58) Field of Classification Search
CPC ............ B64C 39/024; B64C 2201/127; B64C 2201/208; B64C 2201/145; B64C 2201/122; B64C 39/02
See application file for complete search history.

(56) References Cited

U.S. PATENT DOCUMENTS

| | | | | |
|---|---|---|---|---|
| 10,188,580 B2 * | 1/2019 | Dayal | ................ | H04W 4/40 |
| 10,356,367 B2 * | 7/2019 | Miyano | ................ | G05B 19/02 |
| 10,370,102 B2 * | 8/2019 | Boykin | ................ | G06F 3/165 |
| 10,482,418 B2 * | 11/2019 | Burch, V | ............ | G05D 1/0094 |
| 10,633,115 B2 * | 4/2020 | Pilskalns | ............... | B60L 53/126 |
| 10,665,115 B2 * | 5/2020 | Fragoso | ................ | B64C 39/024 |
| 10,683,088 B2 * | 6/2020 | Erickson | ............... | B64C 39/024 |
| 10,701,913 B2 * | 7/2020 | Twining | .............. | A01M 31/002 |
| 10,730,626 B2 * | 8/2020 | Gil | ......................... | G08G 5/025 |
| 10,746,559 B2 * | 8/2020 | Baughman | ........... | G08G 5/0086 |
| 10,775,792 B2 * | 9/2020 | Cooper | ................ | G06Q 10/083 |
| 10,827,725 B2 * | 11/2020 | Sawada | ................. | A01K 11/008 |
| 10,839,699 B2 * | 11/2020 | Hardee | ................ | G08G 5/0039 |
| 10,847,041 B1 * | 11/2020 | Navot | ................. | G08G 5/0069 |
| 10,882,614 B2 * | 1/2021 | Tian | ...................... | B64C 39/024 |
| 10,891,856 B1 * | 1/2021 | Graham | ................. | H04L 67/12 |
| 10,894,601 B2 * | 1/2021 | Blake | ......................... | H02J 7/00 |
| 10,904,562 B2 * | 1/2021 | Wu | ........................ | H04N 19/521 |
| 10,931,597 B2 * | 2/2021 | Johnson | .................. | B60L 53/60 |
| 10,942,990 B2 * | 3/2021 | Bennett | ................ | G05D 1/0291 |
| 11,006,263 B2 * | 5/2021 | Ferreira | ................. | B64D 47/04 |
| 11,011,066 B2 * | 5/2021 | Ben-David | ............ | G08G 5/025 |
| 11,053,021 B2 * | 7/2021 | Di Benedetto | ......... | B64D 47/08 |
| 11,059,582 B2 * | 7/2021 | Nahuel-Andrejuk | ...... | G05D 1/101 |
| 11,064,363 B2 * | 7/2021 | Fox | ........................ | H04W 12/80 |
| 2009/0219393 A1 | 9/2009 | Vian et al. | | |
| 2016/0054143 A1 | 2/2016 | Abuelsaad et al. | | |
| 2016/0129999 A1 | 3/2016 | Mays | | |
| 2016/0272317 A1 | 9/2016 | Cho et al. | | |
| 2016/0304217 A1 * | 10/2016 | Fisher | ..................... | B64F 1/222 |
| 2016/0318523 A1 | 11/2016 | Kim et al. | | |
| 2016/0325835 A1 | 11/2016 | Abuelsaad et al. | | |
| 2016/0340006 A1 * | 11/2016 | Tang | ..................... | B64C 39/024 |
| 2017/0253330 A1 * | 9/2017 | Saigh | ................... | B64C 39/024 |
| 2018/0061235 A1 | 3/2018 | Goldberg et al. | | |
| 2020/0339109 A1 * | 10/2020 | Hong | ..................... | G01S 7/417 |

FOREIGN PATENT DOCUMENTS

| | | |
|---|---|---|
| EP | 3 188 477 | 7/2017 |
| WO | WO 2017/157863 | 9/2017 |

* cited by examiner

IN-VEHICLE INFOTAINMENT SYSTEM COMMUNICATING WITH UNMANNED AERIAL VEHICLE AND METHOD OF OPERATING THE SAME

CROSS-REFERENCE TO RELATED APPLICATION(S)

This application is based on and claims priority under 35 U.S.C. 119 to Korean Patent Application No. 2019-0043763, filed on Apr. 15, 2019, in the Korean Intellectual Property Office, and Indian Patent Application No. 201811025906, filed on Jul. 11, 2018, in the Indian Patent Office, the disclosures of which are incorporated by reference herein in their entireties.

BACKGROUND

1. Field

The present disclosure relates generally to an in-vehicle infotainment (IVI) system that communicates with an unmanned aerial vehicle (UAV).

2. Description of Related Art

In a modern vehicle, the driver remains a critical component of the vehicle's control system as the driver makes numerous decisions directed to the safe operation of the vehicle including speed, steering, obstacle and hazard recognition, and avoidance thereof. Yet, the driver's ability to perform all of these functions can become compromised due to certain factors, such as visibility, which reduce the reaction time needed by the driver to successfully avoid hazards. One of the technologies rapidly growing is autonomous vehicles, which potentially may improve road safety. Road traffic safety refers to the methods and measures used to prevent road users from being killed or seriously injured. Typical road users include pedestrians, cyclists, motorists, vehicle passengers, horse-riders and passengers of on-road public transportation. Although people are working hard to make roads and vehicle safe, the number of road accident cases rises each year. Therefore, it is important to improve road safety technologies to save lives and prevent property damage.

Advanced driver assistance systems (ADAS) which are developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate global positioning system (GPS)/traffic warnings, connect to smartphones, alert drivers of other cars or dangers, keep the driver in the correct lane, or reveal what is in blind spots.

Being aware of hazardous driving conditions can aid in improving the likelihood of a safe driving experience. However, often drivers rely on navigational guidance systems that do not alert drivers of upcoming driving hazards. Although many vehicles include sensing devices to detect changing conditions, those devices may be best suited to evaluate current conditions rather than conditions associated with a road segment that a driver is approaching. For example, FIG. 1A shows a car at a position in which there is a blind spot in which the driver of the car cannot judge if any obstacle is at the other side of the road. In another example, as shown in FIG. 1B, two cars are moving in same lane. If the car that is behind is at a high speed when it turns, then there is a very high chance that the front car is not detected or recognized via the driver's judgement or via sensors at a proper time, which could result in a crash.

There are many challenges that exist in the state of this art. For example, in the case of autonomous vehicles which are mainly dependent on sensors, due to the malfunction of any sensor element the vehicle is prone to accidents. Additionally, most of these sensors operate on a line-of-sight basis, so in the absence of clear visibility, surrounding information is not available to the vehicle in a timely fashion, which may lead to fatal accidents. In the case of manually driven vehicles there are many accidents occurring due to human errors, ranging from visibility, awareness, and focus while driving. Thus, there is a need in the art in order to address the above-mentioned limitations and provide a vehicle guidance system using an unmanned aerial vehicle (UAV) and/or in-vehicle infotainment (IVI) system.

SUMMARY

The present disclosure has been made to address the above-mentioned problems and disadvantages, and to provide at least the advantages described below.

In accordance with an aspect of the present disclosure, a method performed by an IVI system of a vehicle includes identifying an out-of-sight view of the vehicle, determining that information related to the identified out-of-sight view needs to be received from a UAV, identifying coordinates on the identified out-of-sight view to locate the UAV, based on an environment condition at a current position and at a future position of the vehicle, transmitting a signal indicating the coordinates to the UAV, and receiving the information related to the identified out-of-sight view from the UAV located at the coordinates.

In accordance with another aspect of the present disclosure, a method performed by a UAV communicating with a vehicle includes receiving a signal indicating coordinates on an out-of-sight view of the vehicle from an IVI system of the vehicle, moving to the coordinates, identifying information related to the out-of-sight view of the vehicle, and transmitting the information related to the out-of-sight view of the vehicle to the IVI system.

In accordance with another aspect of the present disclosure, an IVI system of a vehicle includes at least one processor and a communication module, in which the at least one processor is configured to identify an out-of-sight view of the vehicle, to determine that information related to the identified out-of-sight view needs to be received from a UAV, to identify coordinates on the identified out-of-sight view for locating the UAV, based on an environment condition at a current position and at a future position of the vehicle, to transmit a signal indicating the coordinates to the UAV through the communication module, and to receive the information related to the identified out-of-sight view from the UAV located at the coordinates through the communication module.

In accordance with another aspect of the present disclosure, a UAV communicating with a vehicle includes at least one processor and a communication module, in which the at least one processor is configured to receive a signal indicating coordinates on an out-of-sight view of the vehicle from an IVI system of the vehicle, through the communication module, to control the UAV to move to the coordinates, to identify information related to the out-of-sight view of the vehicle, and to transmit the information related to the out-of-sight view of the vehicle to the IVI system, through the communication module.

In accordance with another aspect of the present disclosure, a method performed by a primary vehicle communicating with at least one allied secondary vehicle includes receiving, from the at least one secondary vehicle, a position of a road obstacle that is out-of-sight from the primary vehicle, the position of the road obstacle being identified by the at least one secondary vehicle and identifying a position and a speed of the primary vehicle for preventing an accident, based on the position of the road obstacle, the position of the road obstacle being received from the at least one secondary vehicle.

A method performed by an IVI system of a first vehicle includes identifying out-of-sight view information of the first vehicle, transmitting a connection request to an IVI system of a second vehicle, transmitting line-of-sight view information of the first vehicle to the IVI system of the second vehicle, after establishment of a connection with the IVI system of the second vehicle, receiving line-of-sight view information of the second vehicle from the IVI system of the second vehicle, identifying the out-of-sight view information of the first vehicle based on the line-of-sight view information of the second vehicle and the line-of-sight view information of the first vehicle, and identifying a navigation path for the first vehicle, based on the out-of-sight view information of the first vehicle.

BRIEF DESCRIPTION OF THE DRAWINGS

The above and other aspects, features, and advantages of certain embodiments of the present disclosure will be more apparent from the following description taken in conjunction with the accompanying drawings in which.

DETAILED DESCRIPTION

Figure 1A:
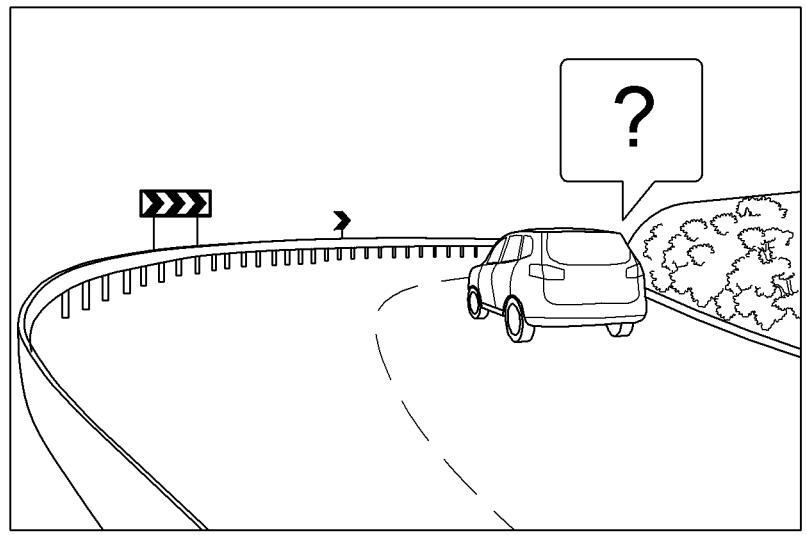
FIG. 1A illustrates a car is heading towards a blind spot and can't judge if any obstacle is at other side of the road ahead, according to the prior art.
Figure 1B:
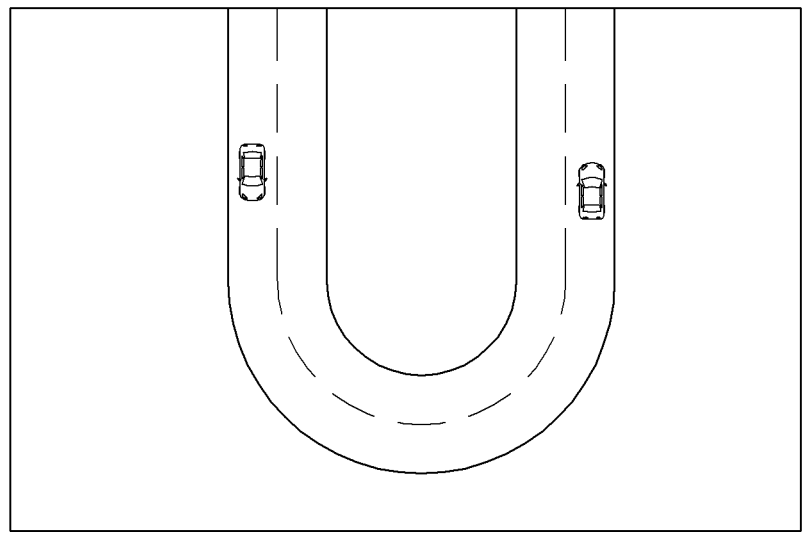
FIG. 1B illustrates two cars travelling in the same lane over an out-of-view path, according to the prior art.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to their dictionary meanings but are merely used to enable a clear and consistent understanding of the disclosure. Accordingly, it should be apparent to those skilled in the art that the following description of embodiments of the present disclosure are provided for illustration purposes only and not for the purpose of limiting the disclosure as defined by the appended claims and their equivalents.

It is to be understood that the singular forms "a," "an," and "the" include plural referents unless the context clearly dictates otherwise.

The disclosure is directed to a road safety method to provide early warning and guidance to prevent accidents and avoid accident prone road behavior. The disclosure is applicable for both manual and driverless/autonomous vehicles.

FIGS. 2 through 13, discussed below, and the various embodiments used to describe the principles of the present disclosure in this patent application are by way of illustration only and should not be construed in any way to limit the scope of the disclosure. Those skilled in the art will understand that the principles of the present disclosure may be implemented in any suitably arranged environment system. The terms used to describe various embodiments are merely examples. It should be understood that these are provided to merely aid the understanding of the description, and that their use and definitions, in no way limit the scope of the disclosure. Terms such as "first" and "second" may be used to differentiate between objects having the same terminology and are in no way intended to represent a chronological order, unless where explicitly stated.

Figure 2:
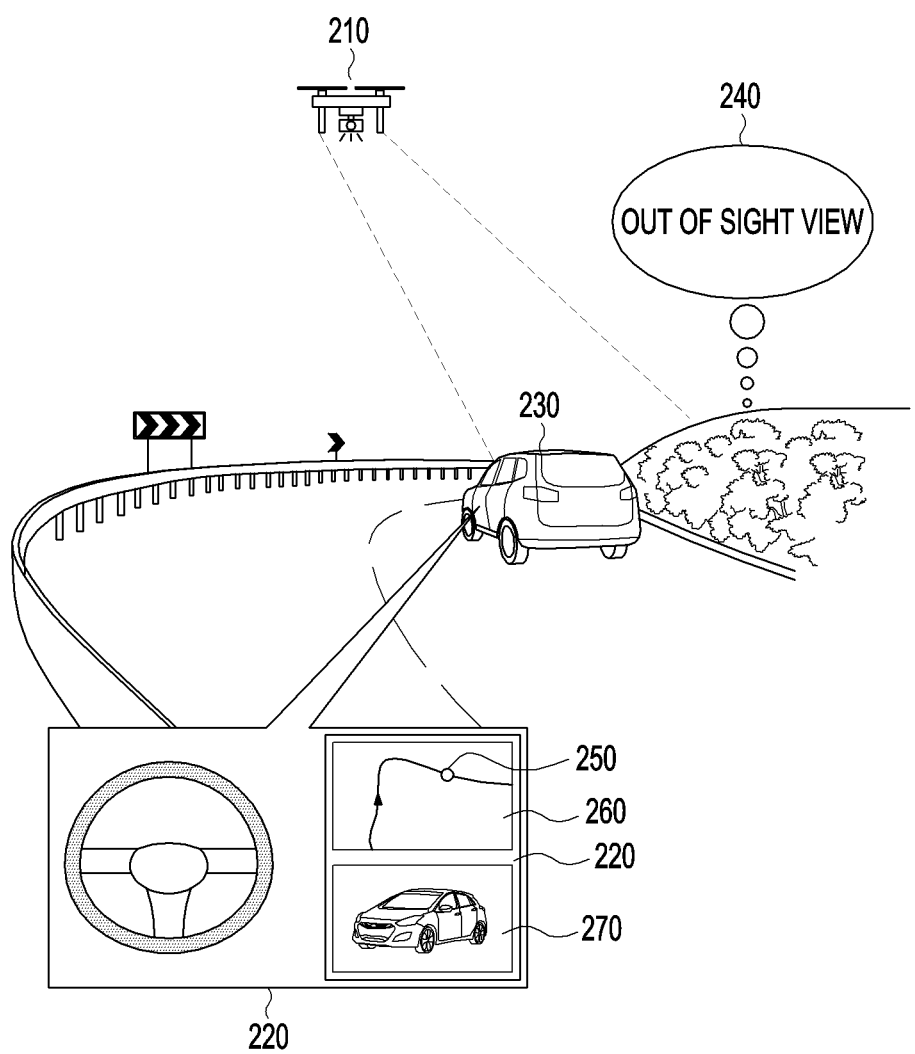
FIG. 2 illustrates a scenario where a UAV provides real time data to an IVI system, according to an embodiment.

FIG. 2 illustrates a pictorial representation where a UAV 210 provides real time data to an IVI system 220, according to an embodiment.

Referring to FIG. 2, where a vehicle 230 is taking is on a path on the road. The vehicle 230 may be an autonomous vehicle or driven by a driver. During the drive an incoming turn may be out-of-sight 240 for the vehicle or the driver. Upon detection of the out-of-sight view 240, the vehicle IVI system 220 shows that the there is an incoming vehicle 250 which is shown on the navigation map 260 of the IVI. The incoming vehicle information is shown on the map in real time. It is also possible that the images of the incoming vehicle are also displayed on the screen of the IVI (as shown in 270). As the vehicle is on a blind curve, the incoming vehicle 250 is out-of-sight for both the driver and the vehicle. On the detection of out-of-sight view 240, the UAV 210 positions itself at a point (in this example representation UAV has been positioned above the mountain ditch), so that UAV 210 can have a clear view of "out-of-view" traffic, mountain ditch or any other object. The information sighted by UAV 210 is transferred to the IVI system 220 of the vehicle. The information transfer can be use any of the data transfer algorithms like ZigBee™ or any other proprietary protocols. Based on the input data received from the UAV, IVI may process the received data and sets the speed or other parameter of the vehicle with which it is safe to make the turn and avoid any possible collision.

Figure 3:
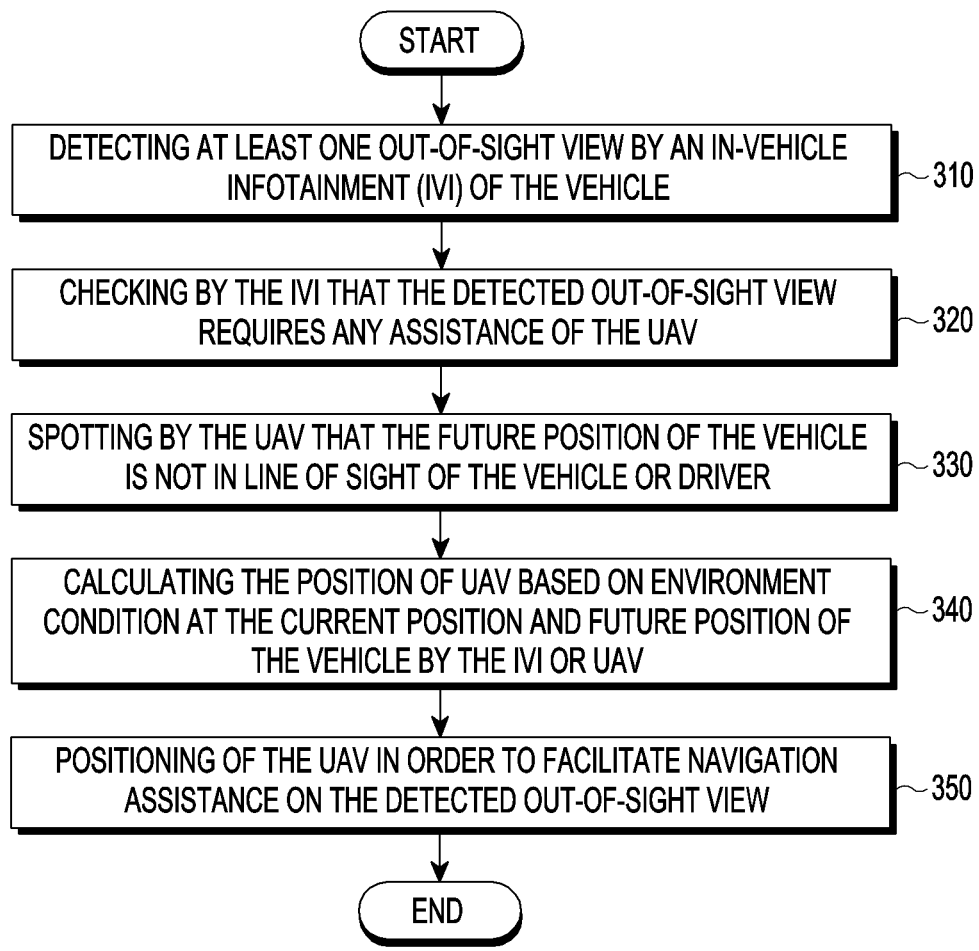
FIG. 3 shows a flow chart of a method for facilitating navigation assistance of a vehicle in a path by positioning a UAV, according to an embodiment.

FIG. 3 shows a flow chart of a method for facilitating navigation assistance of a vehicle in a path by positioning a UAV, according to an embodiment.

At step 310, at least one out-of-sight view by an IVI of the vehicle is detected. The detecting of at least one out-of-sight view by an IVI of the vehicle is by a GPS which provides the terrain information for early computing of turns and of geographical areas that are "in view" or "out of view" with respect to the driver or the autonomous vehicle. In another embodiment, the IVI detects an overtaking scenario (i.e., passing another car), reverse movement or upcoming road turns using GPS or high resolution cameras installed in vehicle and computes undock command. The IVI may compute an undock command for the UAV based on, for example, a determination that the vehicle is put in reverse, the vehicle turns, or if the vehicle attempts to overtake (i.e., pass) another vehicle. The UAV may compute an undock command for itself based on, for example, a determination that the vehicle is put in reverse, the vehicle turns, or the vehicle attempts to overtake another vehicle. At step 320, the method checks that the detected out-of-sight view requires any assistance of the UAV by the IVI. In an embodiment, the UAV may or may not be mounted on the vehicle. The out-of-sight view is calculated based on at least one of but not limited to traffic information, environment condition, line of sight information, GPS information and road condition.

An operation of determining whether an out-of-sight view requires support of the UAV may be performed by the UAV. The UAV may recognize a sign board indicating a sharp curve by using a camera embedded in the UAV and transmit a request for GPS information regarding an incoming curve to the IVI in response to the identification of the sign board indicating the sharp curve. The UAV may recognize surroundings of the curve by using a situation recognition algorithm and identify the curve as out-of-view or as in-view.

At step 330, the future position of the vehicle is spotted by the UAV as not in the line of sight of the vehicle or driver. The calculation of the future position of the vehicle is based on at least but not limited to braking performance of the vehicle, current speed of the vehicle, GPS coordinates, elevation of current position coordinates and the position of the UAV.

At step 340, the method calculates the position of UAV based on environment condition at the current position and future position of the vehicle by the IVI or UAV. The position of the UAV may be computed by the IVI, and the position of the UAV may be computed by the UAV. The environment condition includes but is not limited to terrain, visibility information, weather information, altitude, position, and vehicle information. Further, the environment condition is derived from the captured image of the surrounding area near the UAV, the Internet or other sensors, a distance of a turn, a distance of another vehicle in the path of travel, a distance of an object or position of interest, and a speed of an approaching object or vehicle in the path of travel, wherein the distance information is calculated from GPS information.

At step 350, the UAV is positioned to facilitate navigation assistance on the detected out-of-sight view. The positioning of the UAV is based on at least one of coordinates, latitude, longitude, elevation, altitude, mutual distance and orientation. The UAV may be positioned at the destination coordinates to provide real time data from the position. The real time data is processed by the IVI and controls the speed and other safety operations of the vehicle at turns, while overtaking (i.e. passing) other vehicles, in reverse mode, along mountainsides and at varying elevations. In an embodiment, the IVI of the vehicle sends the coordinates (x, y, and z) or the latitude, longitude and altitude of a point to which UAV has to travel to and start assisting in navigation to avoid an accident by positioning itself to provide a better view of blind spots. The coordinates are calculated based on altitude, position, GPS, terrain, line of sight information, vehicle speed or other factors. In an embodiment, the coordinates of the UAV are based on the current position of the vehicle, GPS position of the turn, speed of the vehicle and terrain information.

The method re-positions the UAV with the updated information received from the vehicle and the vehicle position information. The re-positioning of the UAV is based on but is not limited to at least one of coordinates, latitude, longitude, elevation, altitude, mutual distance and orientation.

Figure 4:
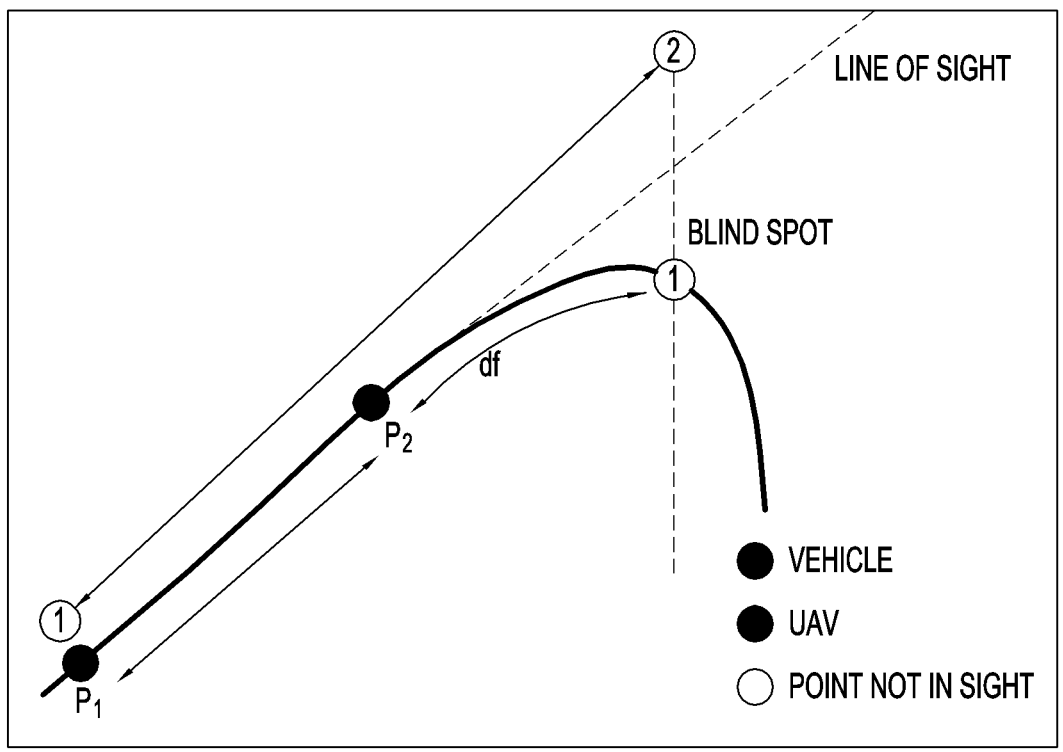
FIG. 4 shows a pictorial representation of identification of current and future position of a vehicle, according to an embodiment.

FIG. 4 shows a pictorial representation of identification of current and future positions of a vehicle, according to an embodiment.

Referring to FIG. 4, the objective is to get the current position $P_1$ of the vehicle using future position $P_2$ and position of blind spot (1). In order to do that, the vehicle IVI keeps polling the navigation information using GPS to detect the turn. Once the turn is detected, the coordinates of blind spot (1), which is not in line of sight, will be identified. When the turn is detected, the vehicle is at position $P_1$. For calculating the future position of the vehicle, which is based on but not limited to braking performance of the vehicle (i.e. the distance between future position $P_2$ of the vehicle and the blind spot, which is the minimum distance required by the vehicle to stop), current speed, GPS coordinates of the blind spot, elevation of the current position coordinates, position of the UAV, which is calculated using the blind spot position. To get the current position of the vehicle, the speed of the UAV should be higher than the vehicle at any point of time. If the distance between the current position and future position of the vehicle is known, one can calculate the GPS coordinates of the current position of the vehicle.

Figure 5:
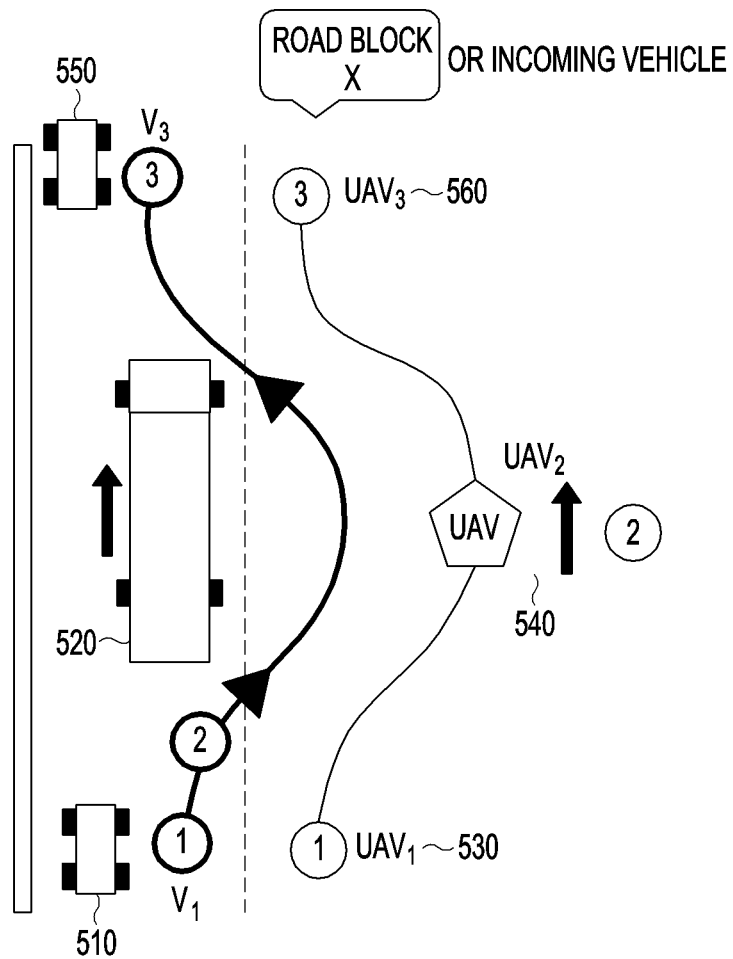
FIG. 5 shows a pictorial representation of a scenario of passing another vehicle in order to calculate the current position and future position of the other vehicle, according to an embodiment.

FIG. 5 shows a pictorial representation of a scenario of overtaking (i.e. passing) another vehicle in order to calculate the current position and future position of the vehicle, according to an embodiment.

Referring to FIG. 5, the camera or radar mounted on the vehicle 510 or the GPS detects the front vehicle 520 and sets the position as current position $V_1$ and the UAV position as $UAV_1$ 530. The front vehicle 520 is detected based on but not limited to image processing algorithms by the IVI. The vehicle 510 is assisted by the UAV which monitors, from position $UAV_2$ 540, the flow of the traffic to and from one lane to another lane. The UAV from position $UAV_2$ 540 facilitates the vehicle to set the future position of the vehicle as $V_3$ 550 and the UAV repositions itself at $UAV_3$ 560.

Figure 6:
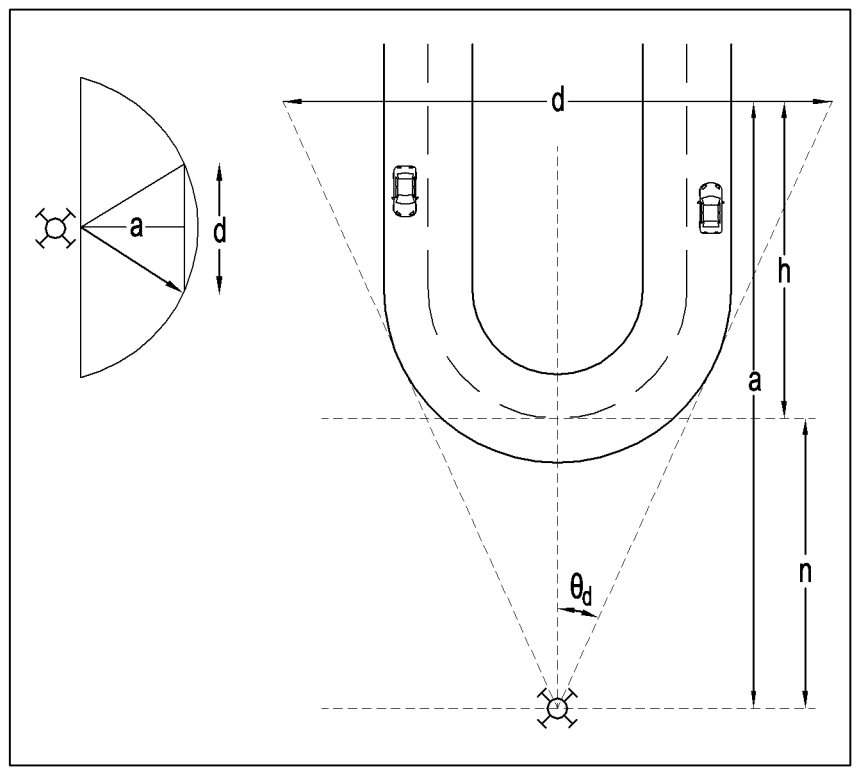
FIG. 6 shows a pictorial representation of calculating an initial position of a UAV based on environmental conditions, and current and future position, according to an embodiment.
Figure 6:
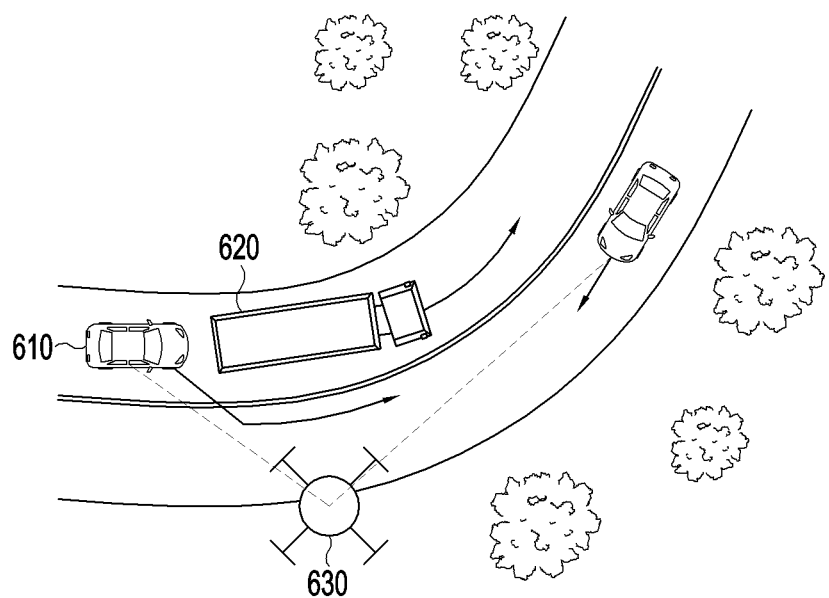

FIG. 6 shows a pictorial representation of calculating an initial position of the UAV based on environmental conditions, current and future position, according to an embodiment.

Referring to FIG. 6, the camera or radar mounted on the vehicle 610 detects a blind spot or provides information on whether to overtake a front vehicle 620. Once a decision is made, the path of the vehicle 610 is modified based on information provided by the GPS. The position of a blind view point is retrieved from the GPS positioning. Once the position of blind view point is retrieved, the initial position of the UAV 630 is determined. The UAV considers the determined position as a reference point and gets the future position of the UAV 630. The initial position of the UAV 630 is based on various parameters including environmental conditions as described in Table (1) below:

FIGS. 7A, 7B, 7C, 7D and 7E show pictorial representations of repositioning a UAV while assisting the vehicle over a drive, according to various embodiments.

Once the UAV reaches the initial position, the UAV needs to get a clear view of the blind spot on the road. For example, the UAV will detect both of the vehicles with high resolution cameras (one camera pointing to a first vehicle and another camera pointing to a second vehicle). The UAV distance from each vehicle is calculated. For example, a distance from the first vehicle to the UAV and a distance from the second vehicle to the UAV is calculated. Based on these distances, the UAV is calibrated or self-adjusted.

To Get the Distance Z from a Vehicle to UAV

Figure 7A:
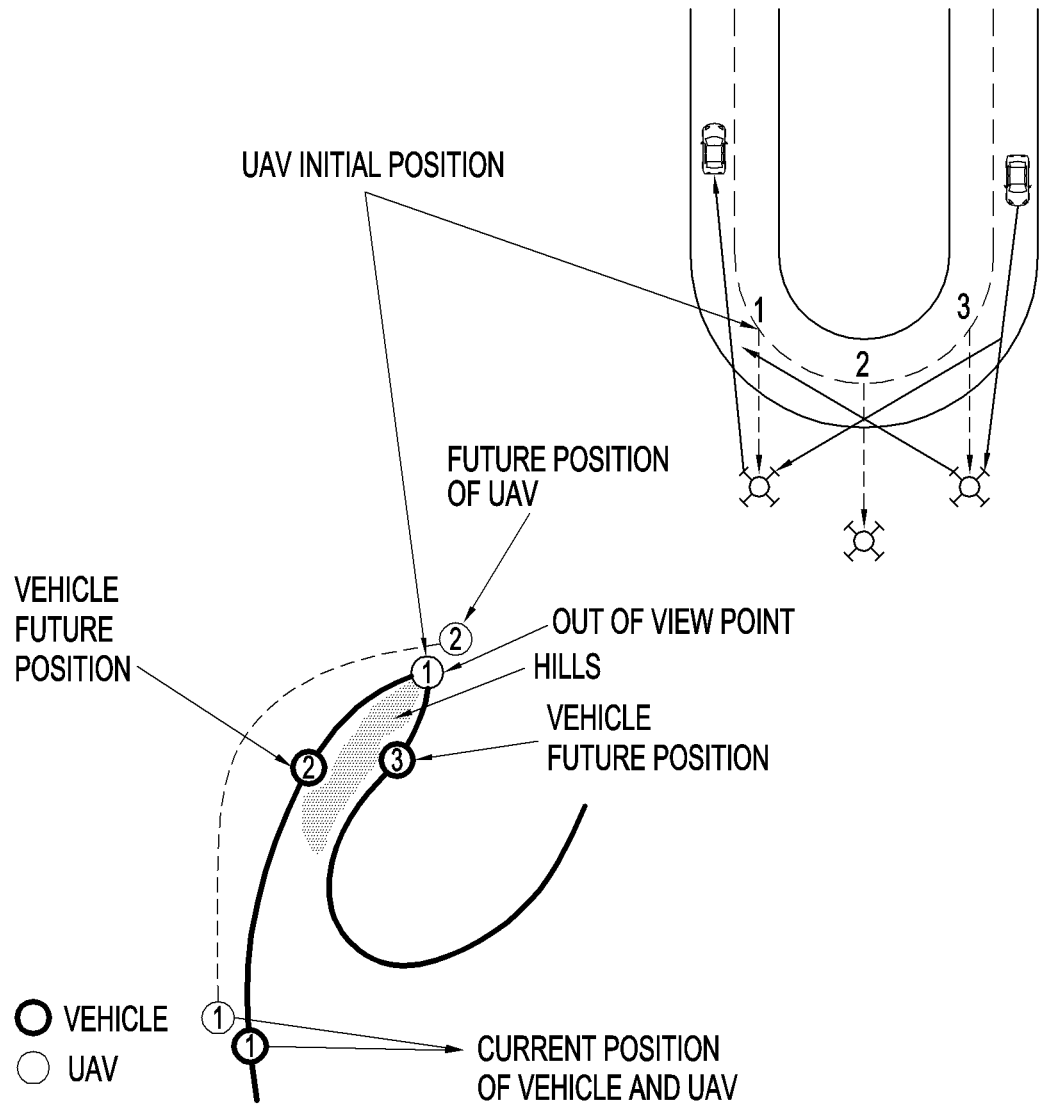
FIGS. 7A, 7B, 7C, 7D and 7E show pictorial representations of repositioning a UAV while assisting the vehicle over a drive, according to various embodiments.
Figure 7B:
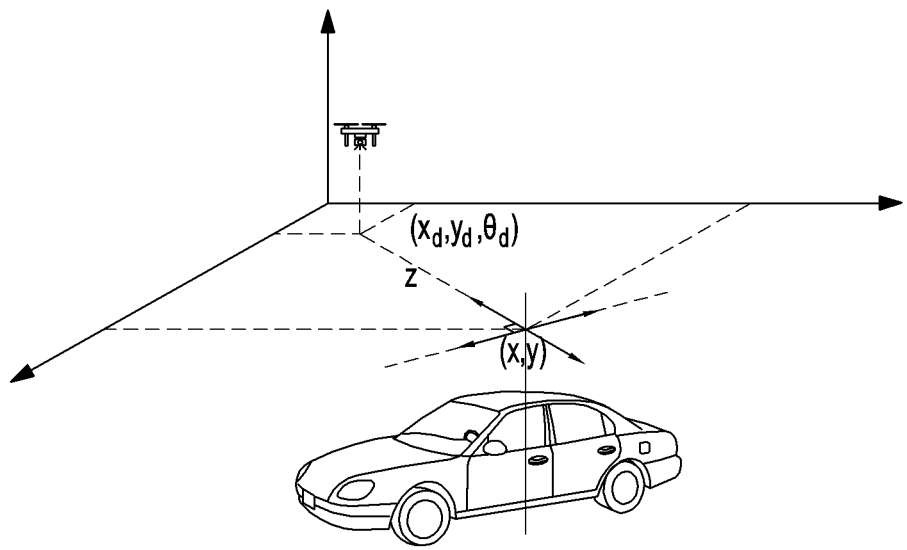
Figure 7C:
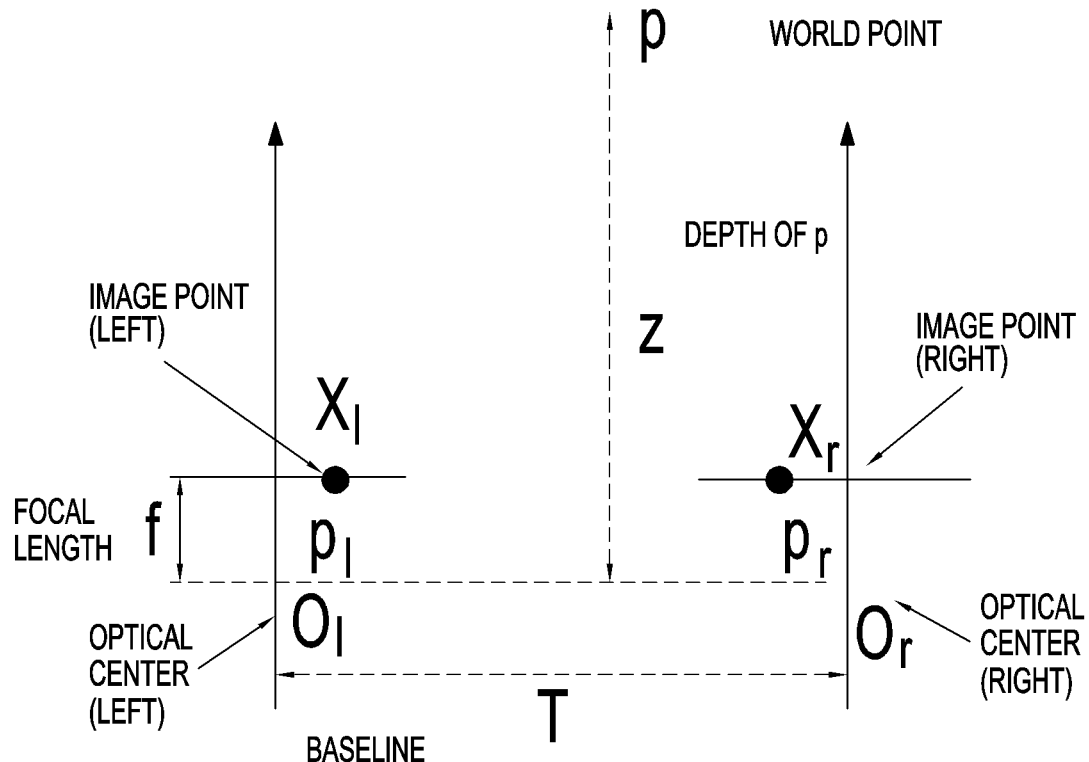
Figure 7D:
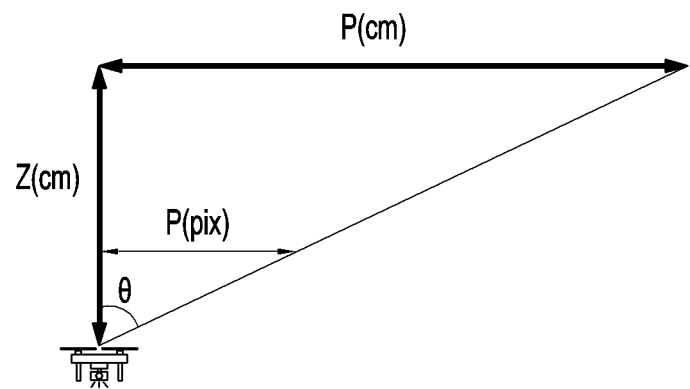
Figure 7E:
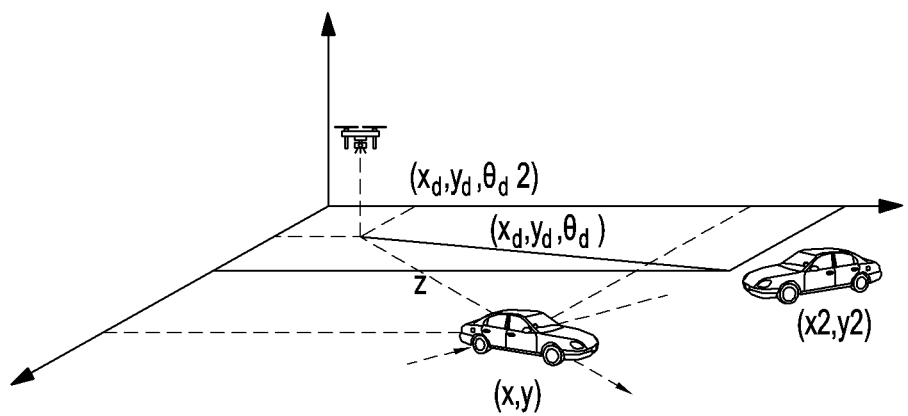

Referring to FIG. 7B, defining $x_d$, $y_d$ are the coordinates of the UAV after calibration using the algorithm described in this section. The UAV will compute the distance Z and angle $\theta_d$ of an object (e.g., vehicle) relative to itself, and then use this distance to compute the position of the object (e.g., vehicle) (x, y) in global coordinates. In order to obtain an accurate estimation of the depth of an object, the camera needs to be calibrated. The basic concept of the classical structure-from-motion algorithm.

Z can be derived according to the following Equation (1):

$$Z = f \frac{T}{x_r - x_l} \qquad \text{Equation (1)}$$

where f is the focal length, T is the baseline and $x_r - x_l$ is the image disparity. The camera needs to be calibrated to find f in order to be able to obtain Z based on the image offset p (position of the object in the image from the axis) to the angle θ subtended by the object from the image center (refer to FIG. 7C). As the image offset p is dependent entirely on

TABLE (1)

| S. No | Environment variable | Parameter | Detection sensor | Valid for Future Position | Valid for Current Position |
|---|---|---|---|---|---|
| 1 | Obstacle | Rocks, Trees, signboards, water, ditch | Camera, sensors | Yes | No |
| 2 | Low Visibility | Fog, smoke, direct sunlight, Night | Camera, sensor, weather monitor application | Yes | Yes |
| 3 | Terrain | Hills, buildings, inclined roads, circular roads | Camera, GPS | Yes | Yes |
| 4 | U turn | Hills, buildings, inclined roads | Camera, GPS | Yes | Yes |
| 5 | Incoming/outgoing vehicle | Vehicle | Camera, sensors, sound detection | Yes | Yes (overtaking, line-of-sight) |
| 6 | Speed of Incoming/Outgoing Vehicle | Relative Speed of vehicles | Camera, sensors, sound detection | Yes | Yes (overtaking, turns) |

Note
Some of the environmental parameters like vehicle, speed are directly used to calculate the position of UAV, whereas some other parameters helps in detecting future visible position from which position of UAV can be calculated.

the focal length, Z must be calibrated for θ/p instead of the focal length f. Z is calculated for both the vehicles, $Z_1$ and $Z_2$ are the respective distances to the first vehicle and to the second vehicle. The decision variable ($D_d$) which is the difference of the distance $Z_1$ and $Z_2$ may be calculated according to the following Equation (2):

$$D_d = \frac{fT(x_{r2} - x_{l2}) - f_2 T_2(x_r - x_l)}{(x_r - x_l)(x_{r2} - x_{l2})} \quad \text{Equation (2)}$$

The UAV, using the camera(s), obtains the distance of each object and re-positions itself based on the obtained distances.

Based on the decision variable $D_d$, the following possibilities may arise as shown in Table (2):

TABLE (2)

| Decision variable | Status |
| --- | --- |
| New $D_d$ > Old $D_d$ | There is no possibility of a crash between the two vehicles |
| New $D_d$ < Old $D_d$ | Vehicles moving towards each other; One vehicle is stationary; or One vehicle's speed is more than the other vehicle's speed in the same direction of movement |
| New $D_d$ = Old $D_d$ | Both the vehicles are stationary |

The UAV repositions itself when the sight of view of either vehicle is lost and the same process will start again.

According to an embodiment, the coordinates of the UAV may be identified based on the following parameters as shown in Table (3).

TABLE (3)

| Current Position of Vehicle | Coordinates of the UAV may be identified based on the current position of the vehicle. |
| --- | --- |
| GPS Position of Turning Point | May be required for identification of initial coordinates of the UAV. After the UAV is located at the initial coordinates, the position of the UAV may be adjusted to obtain a better view. |
| Speed of Vehicle | The view angle of the UAV may be identified based on the current speed of the vehicle. As the speed of the vehicle increases, the vehicle turns fast along a curve, thus the vehicle may need information about a far distance located on the opposite side of the turning point. |
| Terrain Information | The terrain information may be provided by the GPS. The terrain information may include a building, a hill, and other terrain information around the turning point. |

When circular roads are consecutive, the GPS module may detect the turning point and transmit information about the turning point to a UAV controller. The UAV controller may determine whether the UAV is still in a flight mode by communicating with an IVI interface of the UAV. In this case, the UAV may be repositioned continuously instead of going back to the vehicle. The repositioning may be performed by transmitting, by the IVI, continuous coordinates to the UAV. Additionally, the repositioning may be performed by moving, by the UAV, to a new position each time the vehicle passes the turning point.

The UAV may start repositioning as the vehicle passes the UAV in a turn and the IVI using the GPS gets this information. The IVI may initiate the new coordinates for the UAV if a circular turn is determined to exist.

In addition, the UAV may start repositioning as the vehicle processes the images received from the UAV, and the IVI compares it with images of front camera of vehicle. If the image processing data is similar, then it may be determined that the UAV data is not directed to a blind spot for the vehicle.

Additionally, the UAV may start repositioning the vehicle as it passes it and is now monitoring the vehicle.

The repositioning as the vehicle passes the UAV in a turn and the IVI using the GPS gets the information is easily calculated by analyzing the angle θ2 for the vehicle to which support is being provided, if the angle is decreasing from that of an old value then it suggests that the vehicle is going out of range and when the angle is zero or negative from that of the last value, then the UAV will trigger a re-positioning command to assist on the next turn. The angle here is only considered with respect to a connected vehicle (i.e., a following vehicle). The aforementioned characteristics of θ2 are shown below in Table (4).

TABLE (4)

| Decision variable | Status |
| --- | --- |
| New θ2 == Old θ2 | There is no possibility of crash between two vehicle as vehicle is in stationary state |
| New θ2 < Old θ2 | Vehicle moving forward |
| New θ2 == 0 or negative | Both the vehicle passed the view angle of camera and now UAV need to re-position. |

Additionally, the UAV may reposition itself based on a relative speed and a relative position of the vehicle according to the characteristics shown in Table (5), below.

TABLE (5)

| The speed of UAV can be compute based on following parameters - | |
| --- | --- |
| Speed of vehicle | UAV gets the speed of vehicle as UAV has to travel faster than vehicle to reach the spot. |
| Battery status of UAV | If battery is low, then it may affect the speed of UAV and in that case IVI has to decide if trigger the undock command or not |
| Distance to travel | Travel distance decides the speed of UAV |

Figure 8:
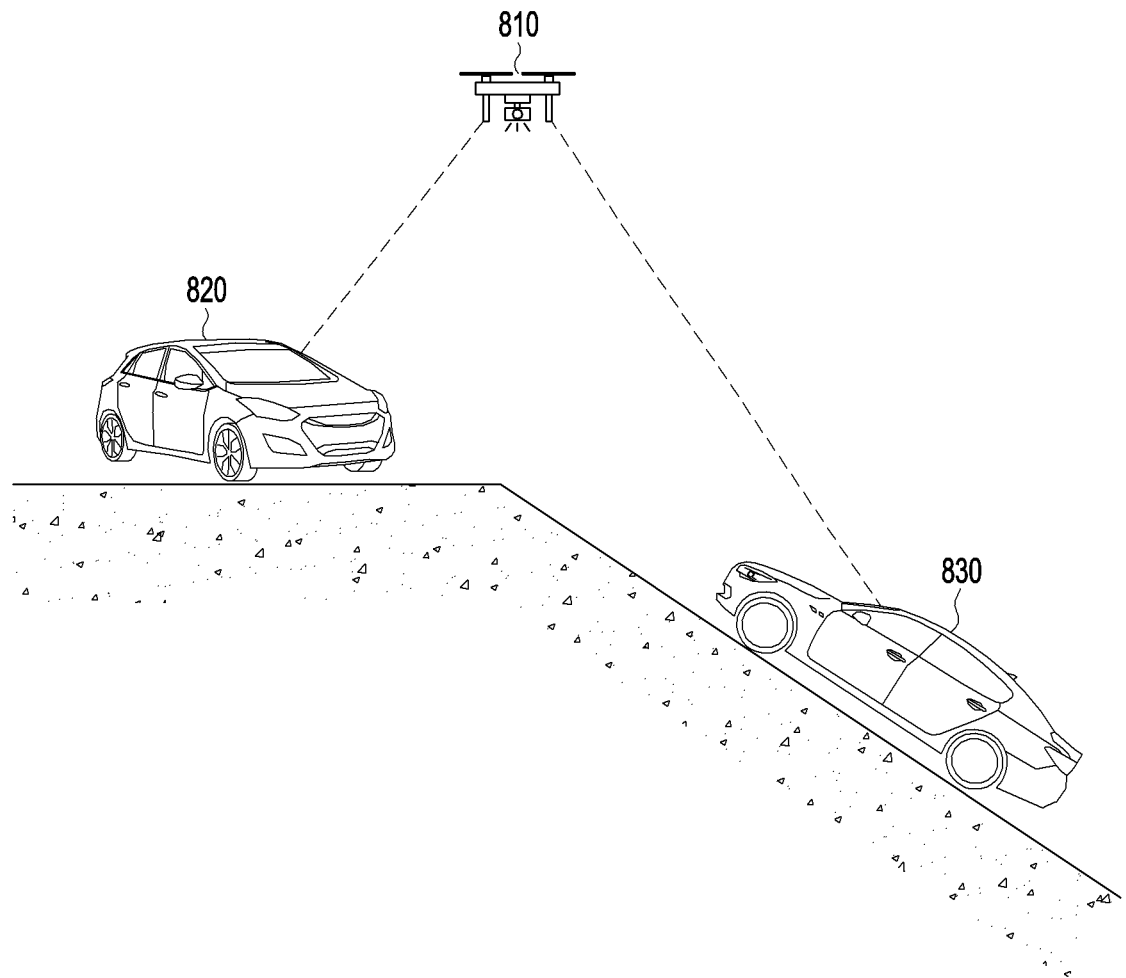
FIG. 8 shows a pictorial representation of a UAV which helps in monitoring by connecting with two vehicles, according to an embodiment.

FIG. 8 shows a pictorial representation of a UAV which helps in monitoring by connecting with two vehicles, according to an embodiment.

Referring to FIG. 8, a single UAV 810 interacts with both the vehicles 820 and 830 and provides the monitoring data to the respective vehicles 820 and 830. Accordingly, the vehicles may be communicatively coupled, thereby advantageously being connected without relying on other connecting vehicle techniques which are based on sensor and radars and have limited access. Two or more than vehicles may thereby know about the traffic or other vehicle information. More than two cameras may provide different viewing angles so that vehicle 1 820 knows the information of vehicle 2 830 and vice versa.

Figure 9:
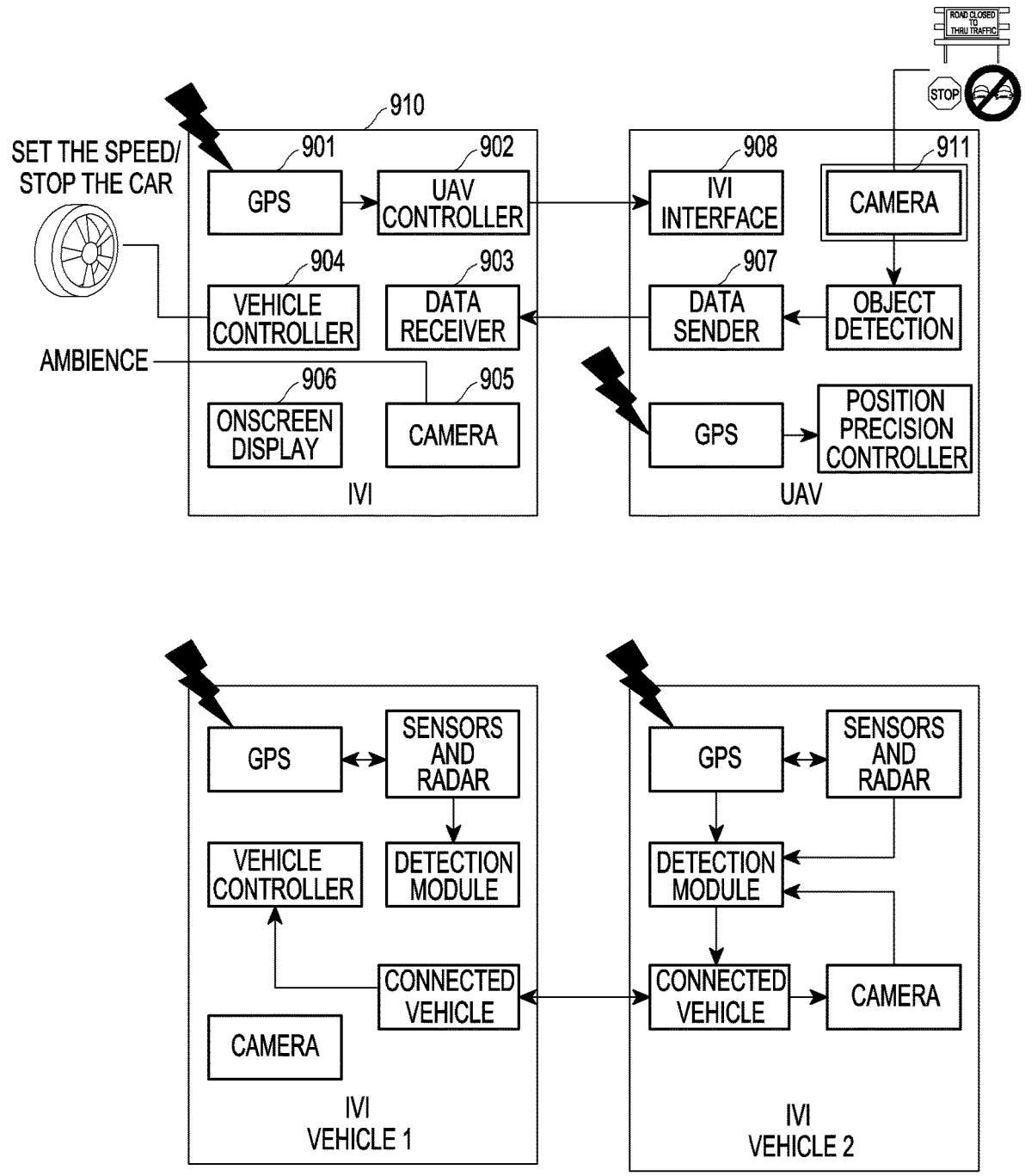
FIG. 9 shows the system architecture block diagram of a UAV and a vehicle, according to an embodiment.

FIG. 9 shows the system architecture block diagram of a UAV and an IVI, according to an embodiment. The IVI system 910 modules consists of major components including but not limited to a GPS 901, a UAV controller 902, a data receiver 903, a vehicle controller 904, a camera 905 and an onscreen display 906. The GPS 901 may be used for navigation and may provide all features related to navigation. The information may include the coordinates (longitude and latitude) and terrain information like nearby hills, buildings, or rivers. This IVI system 901 sends the GPS information to the UAV controller 902 when the UAV controller 902 module requests it, such as when passing another car. The UAV controller 902 module may detect the overtake (i.e., passing) condition and ask for GPS information so that it can calculate the coordinates of the UAV. The GPS module 901 can share the GPS info when any possible blind spot is detected, such as before upcoming turns. In this case the GPS module 901 sends GPS information to the UAV controller module 902. The data receiver 903 processes the data received from UAV data sender module 907. The live data images and audio captured by the UAV is sent, using the IVI interface module 908, to the data receiver module 903. The data received may be or may include incoming/outgoing vehicle information, pedestrian information, road blockage information, speed of other vehicle information, or information relating to the elevation of a turn. The data received based on the above information may be passed via a command to the vehicle controller module 904. The command may set the new speed, stop the vehicle, or change the lane which the vehicle is driving in. The vehicle controller 904 sends commands to vehicle to set speed, direction, switch on lights (indicators) or stop the vehicle based on data received by the data receiver 903. The UAV controller 902 receives inputs from the GPS 901, the camera system 905, and the data receiver 903, and calculates the coordinates of the UAV. When turning, the GPS data is received and UAV controller 902 decides if the turn is "in-view" or "out-of-view" and transmits information to the driver or the vehicle based on the decision. If the turn is out-of-view, then a command with coordinates is sent to the UAV interface module. In the case of an "in-view" turn, the UAV controller decides whether to send an undock command to the UAV. In the case of a manual driver, he or she may be able to see the traffic at turns so assistance may not be required. In the case of an autonomous vehicle, assistance may be required depending on the radar and sensor range.

Figure 10:
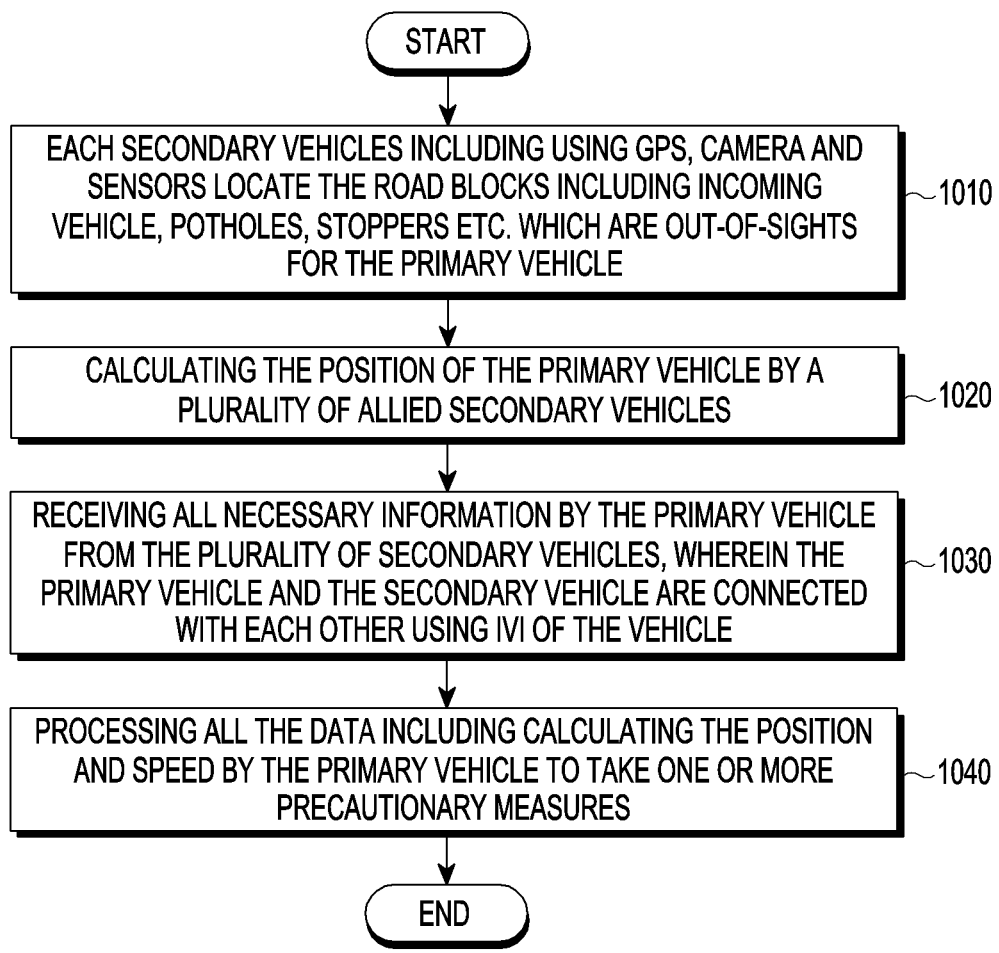
FIG. 10 shows a flow chart of a method for facilitating navigation assistance to a primary vehicle via at least one allied secondary vehicle, according to an embodiment.

FIG. 10 shows a flow chart of a method for facilitating navigation assistance to a primary vehicle via at least one allied secondary vehicle, according to an embodiment.

At step 1010, each secondary vehicle using GPS, a camera or sensors locates the road blocks including incoming vehicle, potholes, or stoppers which are out-of-sight for the primary vehicle. The primary vehicle and the secondary vehicle are connected via the IVI system. The detecting of at least one out-of-sight view by an IVI of the vehicle is by a GPS which provides the terrain information for early computing of turns and a geographical area that are "in view" or "out of view" with respect to the driver/autonomous vehicle. The IVI may detect the overtaking (i.e., passing) scenario, reverse movement or upcoming road turns using GPS or high resolution cameras installed in the vehicle.

At step 1020, the position of the primary vehicle is calculated by a plurality of allied secondary vehicles.

At step 1030, all necessary information is received by the primary vehicle from the at least one secondary vehicle, where the primary vehicle and the secondary vehicle are connected with each other using the IVI of the vehicle.

At step 1040, all the data is processed by calculating the position and speed of the primary vehicle to take one or more precautionary measures.

Figure 11:
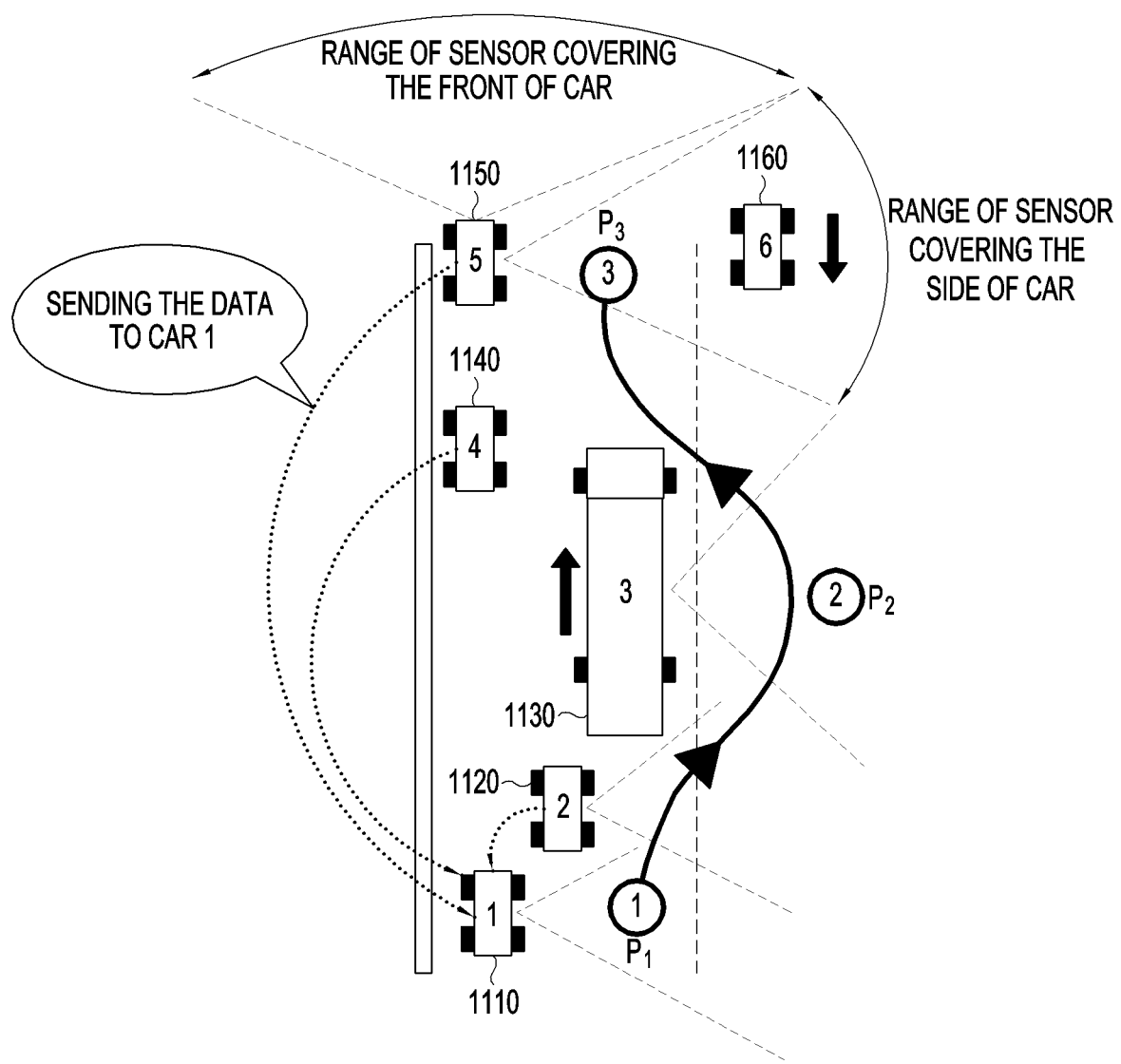
FIG. 11 shows a pictorial representation for getting the current and future positions of a vehicle using connected vehicles, according to an embodiment.

FIG. 11 shows a pictorial representation for getting the current and future position of a vehicle using connected vehicles, according to an embodiment.

Referring to FIG. 11, vehicle 1 1110 needs to take overtake (i.e. pass) the front of vehicle 3 1130 on the road. A plurality of secondary vehicles (i.e. vehicle 2 1120, vehicle 4 1140, and vehicle 5 1150) are all on the road going in the same direction as vehicle 1 1110. Each of the vehicles are connected with each other using the IVI of each vehicle. Each of the vehicle may use GPS, cameras and sensors to locate the road blocks (like an incoming vehicle i.e. vehicle 6 1160, potholes, or stoppers which are out-of-sight for vehicle 1 1110). All the vehicles send data to vehicle 1 1110 using the connected IVI of the vehicles. Vehicle 1 1110 processes all of the received data from the other vehicles (i.e. vehicle 2 1120, vehicle 4 1140, and vehicle 5 1150) and calculates the position and speed of the front vehicle 1130 to which it has to overtake (i.e., pass). Vehicle 1 1110 calculates the position $P_1$, when it starts passing. The position of vehicle 1 1110 will be at $P_2$ at the time of passing vehicle 3 1130 and the final position i.e. $P_3$ after overtaking. The data is continuously transferred until vehicle 1 1110 reaches position $P_3$. Thus, the vehicles are re-positioned and speed is set based on current data.

Figure 12:
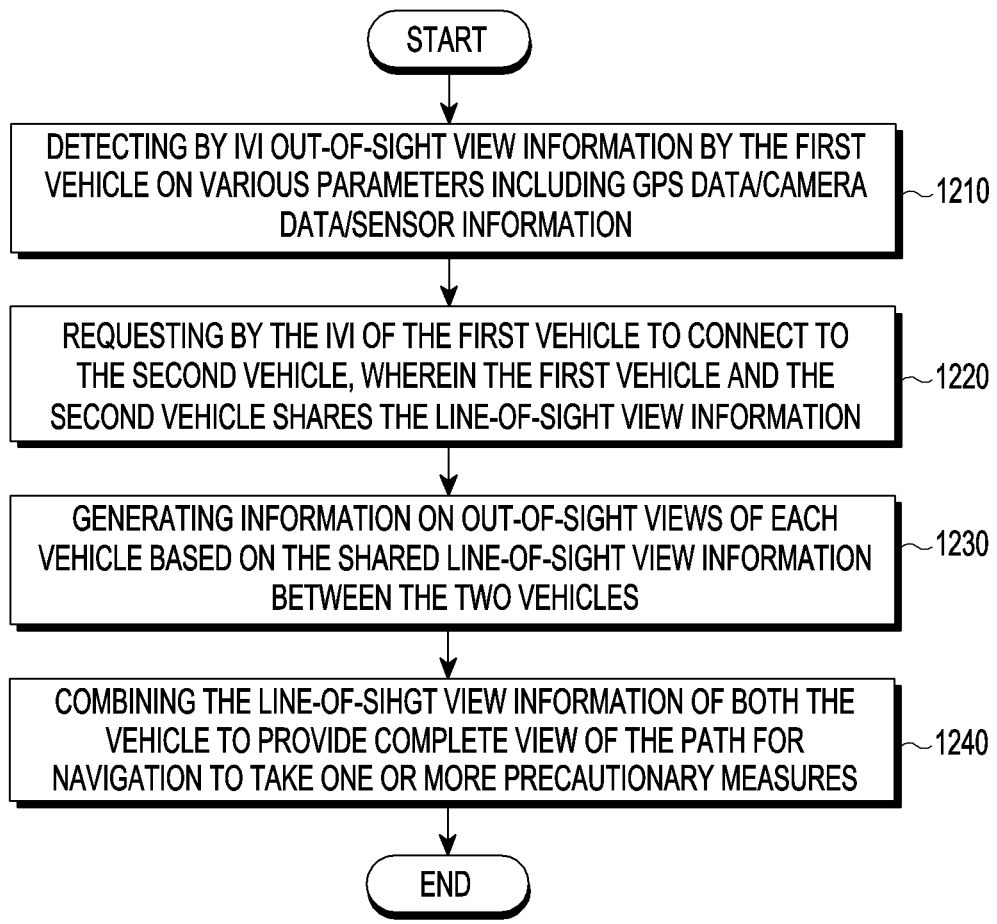
FIG. 12 is a flowchart of a method for allowing navigation support on a path between two vehicles connected through an IVI unit, i.e., a first vehicle and a second vehicle, according to an embodiment.

FIG. 12 shows a flow chart of a method for facilitating navigation assistance on a path between two vehicles, a first vehicle and a second vehicle which are connected via an IVI unit, according to an embodiment.

At step 1210, out-of-sight view information is detected by the IVI of the first vehicle based on various parameters including GPS data, camera data, and sensor information. The detecting of at least one out-of-sight view by an IVI of the vehicle is by a GPS which provides the terrain information for early computing of turns and geographical information for "in view" or "out of view" areas with respect to the driver or autonomous vehicle. Additionally, the IVI may detect the overtaking scenario (i.e., passing), reverse movement or upcoming road turns using GPS or high resolution cameras installed in vehicle.

At step 1220, the first vehicle is requested by the IVI to connect to the second vehicle, where the first vehicle and the second vehicle share the line-of-sight view information.

At step 1230, information on out-of-sight views of each vehicle is generated based on the shared line-of-sight view information between the two vehicles.

At step 1240, the line-of-sight view information of both the vehicles is combined to provide a complete view of the path for navigation in order to take one or more precautionary measures.

Figure 13:
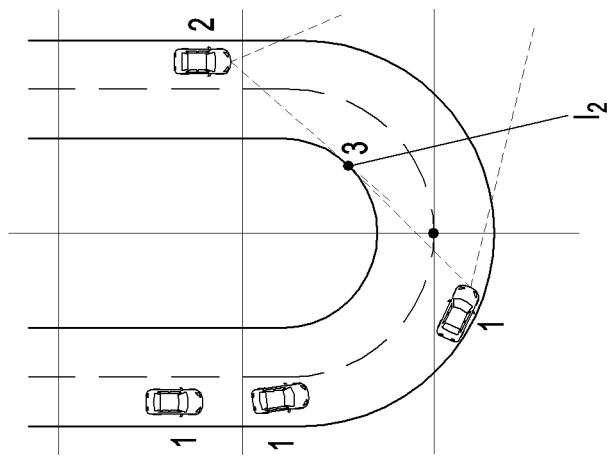
FIG. 13 is a pictorial representation of a scenario for obtaining current and future positions of a vehicle by using connected vehicles, according to an embodiment.
Figure 13:
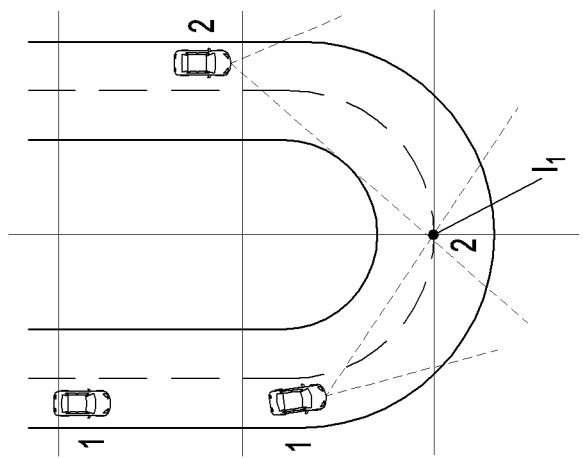
Figure 13:
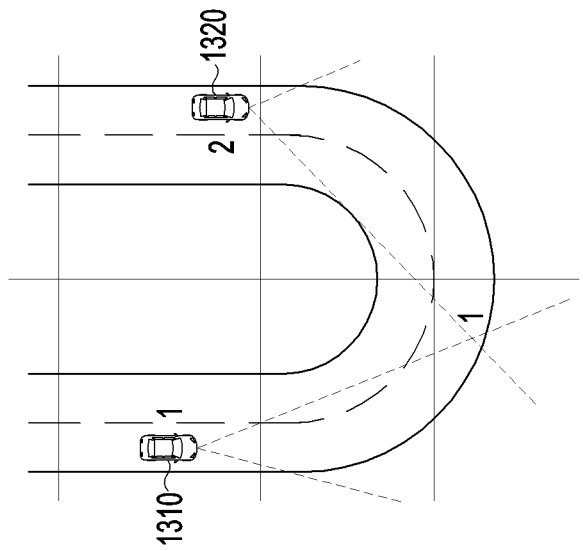

FIG. 13 shows a pictorial representation in another scenario for getting the current and future positions of a vehicle using connected vehicles, according to an embodiment. Vehicle 2 1320 provides the support for out-of-sight view for vehicle 1 1310 using its sensors, camera and GPS. Vehicle 2 1320 can be incoming or outgoing. Vehicle 1 1310 is positioned at an area to receive clear information about the incoming path. At this position, a cover area intersection (the sensor beam from vehicle 2 1320 and vehicle 1 1310 intersect) is shifted from $I_1$ to $I_2$. $I_2$ is when the intersection of coverage is at least on the lane boundary, providing complete coverage for an incoming path on the road. The intersection point can be calculated using laser beams from both vehicles and calculates the beam intersection point and then compares it with the lane coordinates.

FIGS. 1-13 are merely representative drawings and are not drawn to scale. Certain portions thereof may be exaggerated, while others may be minimized. FIGS. 1-13 illustrate various embodiments of the disclosure that can be understood and appropriately carried out by those of ordinary skill in the art.

What is claimed is:

1. A method performed by an in-vehicle infotainment (IVI) device of a vehicle, the method comprising:
identifying an out-of-sight view of the vehicle based on global positioning system (GPS) information;
determining that information related to the out-of-sight view needs to be received from an unmanned aerial vehicle (UAV);
identifying, using the UAV, that a future position of the vehicle spotted is not in a line of sight of the vehicle;
identifying coordinates on the out-of-sight view to locate the UAV, based on an environment condition at a current position of the vehicle and an environment condition at the future position of the vehicle;
transmitting a signal including the coordinates to the UAV such that the UAV positions to the coordinates; and
receiving the information related to the out-of-sight view from the UAV located at the coordinates.

2. The method of claim 1, wherein the signal including the coordinates comprises at least one of a latitude, a longitude, an elevation, an altitude, a mutual distance between a position of the vehicle and the coordinates, or a direction indicating the coordinates from the vehicle.

3. The method of claim 1, further comprising transmitting, to the UAV, updated information related to the vehicle for updating the position of the UAV.

4. The method of claim 1, wherein the UAV is docked onto the vehicle.

5. The method of claim 1, wherein the UAV is undocked from the vehicle.

6. The method of claim 1, wherein the out-of-sight view is identified further based on at least one of traffic information, an environment condition, line-of-sight information, or a road condition.

7. The method of claim 1, wherein the environment condition comprises at least one of terrain, visibility information, weather information, an altitude, a position, or vehicle information.

8. The method of claim 7, wherein the environment condition is identified based on at least one of:
an image of a surrounding area captured by the UAV, Internet or other sensors,
a distance of turn,
a distance of another vehicle in a path of travel,
a distance between an object or position of interest and the vehicle, or
a speed of an object or vehicle approaching in a path of travel, and
wherein at least one of the distance of turn, the distance of the other vehicle in the path of travel, or the distance between the object or position of interest and the vehicle is identified based on the GPS information.

9. The method of claim 1, wherein the future position of the vehicle is identified based on at least one of braking performance of the vehicle, a current speed of the vehicle, GPS coordinates of the vehicle, or the position of the UAV.

10. An in-vehicle infotainment (IVI) device of a vehicle, the IVI system comprising:
at least one processor; and
a communication module,
wherein the at least one processor is configured to:
identify an out-of-sight view of the vehicle based on global positioning system (GPS) information;
determine that information related to the out-of-sight view needs to be received from an unmanned aerial vehicle (UAV);
identify, using the UAV, that a future position of the vehicle spotted is not in a line of sight of the vehicle;
identify coordinates on the out-of-sight view for locating the UAV, based on an environment condition at a current position of the vehicle and an environment condition at a future position of the vehicle;
transmit, through the communication module, a signal including the coordinates to the UAV such that the UAV positions to the coordinates; and
receive, through the communication module, the information related to the out-of-sight view from the UAV located at the coordinates.

11. The IVI device of claim 10, wherein the at least one processor is further configured to transmit, to the UAV, updated information related to the vehicle for updating the position of the UAV, through the communication module.

12. The IVI device of claim 10, wherein the out-of-sight view is identified further based on at least one of traffic information, an environment condition, line-of-sight information, or a road condition.

13. The method of claim 1, wherein identifying the out-of-sight view of the vehicle comprises:
transmitting a connection request to an IVI system of an external vehicle;
transmitting line-of-sight view information of the vehicle to the IVI system of the external vehicle, after establishment of a connection with the IVI system of the external vehicle;
receiving line-of-sight view information of the external vehicle from the IVI system of the external vehicle; and
identifying the out-of-sight view information of the vehicle, based on the line-of-sight view information of the external vehicle and the line-of-sight view information of the vehicle.

14. The method of claim 13, further comprising providing a navigation path for the vehicle, based on the out-of-sight view information of the vehicle.

* * * * *